US011687333B2

(12) United States Patent
Cai et al.

(10) Patent No.: US 11,687,333 B2
(45) Date of Patent: Jun. 27, 2023

(54) FEATURE DECOUPLING LEVEL

(71) Applicants: Drexel University, Philadelphia, PA (US); University of Hawaii, Honolulu, HI (US)

(72) Inventors: Yuanfang Cai, Paoli, PA (US); Ran Mo, Philadelphia, PA (US); Frederick Kazman, Pittsburgh, PA (US)

(73) Assignees: Drexel University, Philadelphia, PA (US); University of Hawaii, Honolulu, HI (US)

( * ) Notice: Subject to any disclaimer, the term of this patent is extended or adjusted under 35 U.S.C. 154(b) by 0 days.

(21) Appl. No.: 16/261,616

(22) Filed: Jan. 30, 2019

(65) Prior Publication Data

US 2019/0235860 A1 Aug. 1, 2019

Related U.S. Application Data

(60) Provisional application No. 62/623,677, filed on Jan. 30, 2018.

(51) Int. Cl.
*G06F 8/70* (2018.01)
(52) U.S. Cl.
CPC ..................................... *G06F 8/70* (2013.01)
(58) Field of Classification Search
CPC ..... G06F 8/70; G06F 8/72; G06F 8/75; G06F 8/77
See application file for complete search history.

(56) References Cited

U.S. PATENT DOCUMENTS

| 6,064,986 A | 5/2000 | Edelman |
| 8,943,464 B2 | 1/2015 | Duesterwald et al. |
| 9,235,611 B1 | 1/2016 | Murray et al. |

(Continued)

FOREIGN PATENT DOCUMENTS

| WO | 2014/155148 A1 | 10/2014 |
| WO | 2017/106863 A1 | 6/2017 |

OTHER PUBLICATIONS

Xiao, Lu, Yuanfang Cai, and Rick Kazman. "Design rule spaces: A new form of architecture insight." Proceedings of the 36th International Conference on Software Engineering. 2014. Retrieved from the Internet: URL<https://dl.acm.org/doi/abs/10.1145/2568225.2568241> (Year: 2014).*

(Continued)

*Primary Examiner* — S. Sough
*Assistant Examiner* — Cheneca Smith
(74) *Attorney, Agent, or Firm* — Schott, P.C.

(57) ABSTRACT

Enabling quick feature delivery is essential for product success and is therefore a goal of software architecture design. But how may we determine if and to what extent an architecture is "good enough" to support feature addition and modification, or determine if a refactoring effort is successful in that features may be added more easily? The applications may use Feature Space and Feature Dependency, derived from a software project's revision history that capture the dependency relations among the features of a system in a feature dependency structure matrix (FDSM), using features as first-class design elements. The applications may also use a Feature Decoupling Level (FDL) metric that may be used to measure the level of independence among features.

14 Claims, 20 Drawing Sheets

(56) References Cited

U.S. PATENT DOCUMENTS

| | | | |
|---|---|---|---|
| 2004/0225597 | A1 | 11/2004 | Oppenheimer et al. |
| 2006/0285598 | A1 | 12/2006 | Tulkki |
| 2008/0092108 | A1 | 4/2008 | Corral |
| 2012/0159420 | A1 | 6/2012 | Yassin et al. |
| 2013/0219362 | A1* | 8/2013 | Cai .................. G06F 8/74 717/123 |
| 2016/0203071 | A1 | 7/2016 | Cai et al. |
| 2017/0060941 | A1 | 3/2017 | Yan et al. |
| 2018/0374024 | A1 | 12/2018 | Cai et al. |
| 2019/0317757 | A1* | 10/2019 | Jodoin .................. G06F 8/60 |

OTHER PUBLICATIONS

Mo, Ran, et al. "Hotspot patterns: The formal definition and automatic detection of architecture smells." 2015 12th Working IEEE/IFIP Conference on Software Architecture. IEEE, 2015. Retrieved from the Internet:URL<https://ieeexplore.ieee.org/abstract/document/7158503> (Year: 2015).*

Maldonado, E.Da S., and Shihab, E., "Detecting and quantifying different types of self-admitted technical debt," 2015 IEEE 7th International Workshop on Managing Technical Debt (MTD), pp. 8 (Apr. 2015).

McCabe, T.J., "A complexity measure," IEEE Transactions on Software Engineering, vol. 2, No. 4, pp. 308-320 (1976).

Mo, R., et al., "Hotspot patterns: The formal definition and automatic detection of architecture smells," 2015 12th Working IEEE/IFIP Conference on Software Architecture, pp. 10 (2015).

Naedele, M., et al., "Manufacturing execution systems: A vision for managing software development," Journal of Systems and Software, vol. 101, pp. 59-68 (2015).

Nagappan, N., et al., "Mining metrics to predict component failures," in Proc. 28th International Conference on Software Engineering, pp. 452-461 (2006).

Nord, R., et al., "In Search of a Metric for Managing Architectural Technical Debt," 2012 Joint Working IEEE/IFIP Conference on Software Architecture and European Conference on Software Architecture, pp. 91-100 (2012).

Nouh, A., et al., "Improving feature location by enhancing source code with stereotypes," in Proc. 29thIEEE International Conference on Software Maintenance, pp. 300-309 (2013).

Dstrand, T. J., et al., "Predicting the location and number of faults in large software systems," IEEE Transactions on Software Engineering, vol. 31, No. 4, pp. 340-355 (2005).

Ran, M., et al., "Decoupling level: A new metric for architectural maintenance complexity," in Proc. 38thinternational Conference on Software Engineering, pp. 499-510 (2016).

Robillard, MP, "Topology analysis of software dependencies," ACM Transactions on Software Engineering and Methodology, vol. 17, No. 4, pp. 36 (2008).

Safyallah, H., and Sartipi, K., "Dynamic analysis of software systems using execution pattern mining," in Proc. 14th IEEE International Conference on Program Comprehension, pp. 6 (2006).

Schwanke, R., et al., "Measuring architecture quality by structure plus history analysis," in Proc. 35rd International Conference on Software Engineering, pp. 891-900 (2013).

Seaman, C., et al., "Technical debt: Beyond definition to understanding report on the sixth international workshop on managing technical debt," ACM SIGSOFT Software Engineering Notes, vol. 40, No. 2, pp. 32-34 (2015).

Sullivan, K.J., et al., "The structure and value of modularity in software design," ACM SIGSOFT Software Engineering Notes, vol. 26, No. 5, pp. 99-108 (2001).

Tim, M., et al., "Local vs. global models for effort estimation and defect prediction," in Proc. 26thIEEE/ACM International Conference on Automated Software Engineering, pp. 343-351 (2011).

Wong, S., et al., "Design rule hierarchies and parallelism in software development tasks," in Proc. 24th IEEE/ACM International Conference on Automated Software Engineering, pp. 197-208 (2009).

Wong, S., et al., "Detecting Software Modularity Violations," 2011 33rd International Conference on Software Engineering (ICSE), pp. 1-10 (2011).

Xiao, L., "Quantifying Architectural Debts," ESEC/FSE 2015 Proceedings of the 2015 10th Joint Meeting on Foundations of Software Engineering, pp. 1030-1033 (2015).

Xiao, L., et al., "Titan: A toolset that connects software architecture with quality analysis," in 22nd ACM SIGSOFT International Symposium on the Foundations of Software Engineering, pp. 763-766 (2014).

Xiao, Y.C., and Kazman, R., "Design rule spaces: A new form of architecture insight," in Proc. 36th International Conference on Software Engineering, pp. 967-977 (2014).

MacCormack, A., et al., "Exploring the structure of complex software designs: An empirical study of open source and proprietary code," Management Science, vol. 52, No. 7, pp. 1015-1030 (2006).

Fowler, M, et al., "Refactoring: Improving the Design of Existing Code," Addison-Wesley, pp. 1-150 (Jul. 1999), part 1.

Fowler, M, et al., "Refactoring: Improving the Design of Existing Code," Addison-Wesley, pp. 151-337 (Jul. 1999), part 2.

"Announcing Apache Wicket 8: Write Less, Achieve More," Apache Software Foundation, accessed at https://wicket.apache.org/, accessed on Mar. 24, 2019, pp. 12.

"Apache Camel," Apache Sowftware Foundation, accessed at http://camel.apache.org/, accessed on Mar. 24, 2019, pp. 5.

"Apache CXF™: An Open-Source Services Framework," accessed at http://cxf.apache.org/, accessed on Mar. 24, 2019, pp. 4.

"Apache Hadoop," accessed at https://hadoop.apache.org/, accessed on Mar. 24, 2019, pp. 5.

"Apache Mahout," accessed at http://mahout.apache.org/, accessed on Mar. 24, 2019, pp. 3.

"Apache PDFBox®—A Java PDF Library," accessed at https://pdfbox.apache.org/, accessed on Mar. 24, 2019, pp. 5.

"Continuous Code Quality," accessed at http://www.sonarqube.org/, accessed on Mar. 24, 2019, pp. 5.

"Discover, Track and Compare Open Source," accessed at https://www.openhub.net/, accessed on Mar. 24, 2019, pp. 5.

"GNU Operating System," GNU Screen, accessed at http://www.gnu.org/software/screen/, accessed on Mar. 24, 2019, pp. 2.

"ICSE Paper Data," accessed at https://www.cs.drexel.edu/~rm859/DL.php, accessed on Mar. 24, 2019, pp. 12.

"InFusion," accessed at https://web.archive.org/web/20151107032101/http://www.intooitus.com/products/infusion, accessed on Mar. 24, 2019, pp. 3.

"Replication package for ICSE Submission: Feature Decoupling Level: A Metric for Assessing an Architecture's Ability to Support Features," Updated on Aug. 2016, accessed at https://www.cs.drexel.edu/~rm859/FeatureDL.html, accessed on Mar. 24, 2019, pp. 4.

"Seventh International Workshop on Managing Technical Debt," in conjunction with ICSME 2015, accessed at https://web.archive.org/web/20150912041641/http://www.sei.cmu.edu/community/td2015/series/, accessed on Mar. 24, 2019, pp. 3.

"System Dashboard," accessed at https://issues.apache.org/jira/secure/Dashboard.jspa, accessed on Mar. 24, 2019, p. 1.

"Use ImageMagick," accessed at http://www.imagemagick.org/, accessed on Mar. 24, 2019, pp. 3.

"Welcome to Apache HBase™," accessed at http://hbase.apache.org/, accessed on Mar. 24, 2019, pp. 2.

"Welcome to the rsync web pages," accessed at https://rsync.samba.org/, accessed on Mar. 24, 2019, pp. 8.

Algorithm 2, ModelSelector (E f fortArray, T), accessed at https://www.cs.drexel.edu/~lx52/ArchDebt.html, accessed on Mar. 24, 2019, pp. 4.

Antonio, G., and Gueheneuc, Y.G., "Feature identification: a novel approach and a case study," 21st IEEE International Conference on Software Maintenance (ICSM'05), pp. 10 (2005).

Antoniol, G., and Gueheneuc, Y.G., "Feature identification: An epidemiological metaphor," IEEE Transactions an Software Engineering, vol. 32, No. 9, pp. 627-641 (2006).

Apache, "What is Cassandra?," accessed at http://cassandra.apache.org/, accessed on Mar. 24, 2019, pp. 3.

(56) References Cited

OTHER PUBLICATIONS

Apel, S., et al., "Exploring feature interactions in the wild: The new feature-interaction challenge," in Proceedings of the 5th International Workshop on Feature-Oriented Software Development, pp. 1-8 (2013).

Apel, S., et al., "Feature-interaction detection based on feature-based specifications," Computer Networks, vol. 57, No. 12, pp. 2399-2409 (2013).

Batory, D., et al., "Features, modularity, and variation points," in Proceedings of the 5th International Workshop on Feature-Oriented Software Development, pp. 9-16 (2013).

Beck, F., et al., "Rethinking user interfaces for feature location," in Proceedings of the 2015 IEEE 23rd International Conference on Program Comprehension, pp. 151-162 (2015).

Bertrand, M., "Object-oriented Software Construction," 2nd ed., PrenticeHall, Inc., pp. 1370 (1997).

Bouwers, E., et al., "Dependency profiles for software architecture evaluations," in Proc. 27thIEEE International Conference on Software Maintenance, pp. 540-543 (2011).

Bouwers, E., et al., "Quantifying the encapsulation of implemented software architectures," in IEEE International Conference on Software Maintenance and Evolution, pp. 211-220 (2014).

Cai, Y., and Sullivan, K.J., "Modularity analysis of logical design models," 21st IEEE/ACM International Conference an Automated Software Engineering (ASE'06), pp. 91-102 (2006).

Cai, Y., et al., "Leveraging design rules to improve software architecture recovery," in Proc. 9th International ACM Sigsoft Conference on the Quality of Software Architectures, pp. 133-142 (2013).

Cataldo, M., et al., "Software dependencies, work dependencies, and their impact on failures," IEEE Transactions on Software Engineering, vol. 35, No. 6, pp. 864-878 (2009).

Chidamber, S. R., and Kemerer, C. F., "A metrics suite for object oriented design," IEEE Transactions on Software Engineering, vol. 20, No. 6, pp. 476-493 (1994).

Curtis, B., et al., "Estimating the principal of an application's technical debt," IEEE Software, vol. 29, No. 6, pp. 34-42 (2012).

Davor, C., et al. "Hipikat: A project memory for software development," IEEE Transactions on Software Engineering, vol. 31, No. 6, pp. 446-465 (2005).

Dit, B., et al., "Feature location in source code: A taxonomy and survey," in Journal of Software Maintenance and Evolution: Research and Practice, pp. 54 (2011).

Dit, B., et al., "Integrating information retrieval, execution and link analysis algorithms to improve feature location in software," Empirical Software Engineering, vol. 18, No. 2, pp. 277-309 (2013).

Zazworka, N., et al., "Comparing four approaches for technical debt identification," in Software Quality Journal, vol. 22, No. 3, pp. 1-24 (2013).

Fowler, M., "A code smell is a surface indication that usually corresponds to a deeper problem in the system," published on Feb. 9, 2006, access at https://www.martinfowler.com/bliki/CodeSmell.html, accessed on Mar. 24, 2019, pp. 2.

Gall, H., et al., "Detection of logical coupling based on product release history," Proceedings. International Conference on Software Maintenance (Cat. No 98CB36272), pp. 190-197 (1998).

Gamma, E., et al., "Design Patterns: Elements of Reusable Object-Oriented Software," Addison-Wesley, pp. 417 (1994).

Garcia, J., et al., "Identifying architectural bad smells," 2009 13th European Conference on Software Maintenance and Reengineering, pp. 255-258 (2009).

Garvin, B.J., et al., "Using feature locality: Can we leverage history to avoid failures during reconfiguration?" In Proceedings of the 8th Workshop on Assurances for Self-adaptive Systems, pp. 24-33 (2011).

Gobei, F., and Clarkson, G., "Chunks in expert memory: evidence for the magical number four . . . or is it two?," vol. 12, No. 6, pp. 732-747 (2004).

Graves, T.L., et al., "Predicting fault incidence using software change history," IEEE Transactions on Software Engineering, vol. 26, No. 7, pp. 653-661 (2000).

Harrison, R., et al., "An investigation into the applicability and validity ofobject-oriented design metrics," Empirical Software Engineering, vol. 3, No. 3, pp. 255-273 (1998).

Juli, R., and Marsha, C., "A Survey of Feature Location Techniques," Domain Engineering, pp. 29-58 (2013).

Julia, R., and Marsha, C., "Locating distinguishing features using diff sets," in Proc. 27thIEEE/ACM International Conference on Automated Software Engineering, pp. 242-245 (2012).

Kazman, R., et al., "A case study in locating the architectural roots of technical debt," 2015 IEEE/ACM 37th IEEE International Conference on Software Engineering, pp. 179-188 (2015).

Li, Z., et al., "Architectural Debt Management in Value-Oriented Architecting," Economics-Driven Software Architecture, pp. 183-204 (2014).

International Search Report and Written Opinion of International Searching Authority for PCT Application No. PCT/US2016/067595 dated May 4, 2017.

Notice of Allowance Issued within the corresponding U.S. Appl. No. 16/063,501, dated Mar. 28, 2022, 14 pages.

Sethi et al., "From Retrospect to Prospect: Assessing Modularity and Stability from Software Architecture," 2009, IEEE, p. 269-272, 2009.

Final Office Action issued from the US Patent and Trademark Office in the corresponding U.S. Appl. No. 16/063,501 dated Jun. 18, 2018, 23 pages.

\* cited by examiner

FIG. 2A

|   | 1 | 2 | 3 | 4 | 5 | 6 |
|---|---|---|---|---|---|---|
| 1 config.CFMetaData_java | (1) |   |   |   |   |   |
| 2 SchemaLoader_java | x | (2) |   |   |   |   |
| 3 thrift.ThriftValidation_java | x |   | (3) |   |   |   |
| 4 cql.QueryProcessor_java | x |   | x | (4) |   |   |
| 5 thrift.CassandraServer_java | x |   | x | x | (5) |   |
| 6 cql.StatementType_java |   |   |   |   |   | (6) |

```
commit 8b24d813b586cbc16783d7b7a384ebfaef4ca3ec
Author: Jonathan Ellis <jbellis@apache.org>
Date:   2011-06-05 13:41:30 +0000 add cql drop index
    patch by pyaskevich and jbellis for CASSANDRA-2617 git-svn-id: https://svn.apache.org/repos/asf/cassandra/branches/cassandra 1   0   0   CHANGES.txt
9   0   0   doc/cql/CQL.textile
37  0   0   src/java/org/apache/cassandra/config/CFMetaData.java
10  0   0   src/java/org/apache/cassandra/cql/Cql.g
47  27  0   src/java/org/apache/cassandra/cql/QueryProcessor.java
1   1   0   src/java/org/apache/cassandra/cql/StatementType.java
7   6   0   src/java/org/apache/cassandra/thrift/CassandraServer.java
51  13  0   src/java/org/apache/cassandra/thrift/ThriftValidation.java
31  4   0   test/system/test_cql.py
1   1   0   test/system/test_thrift_server.py
2   1   0   test/unit/org/apache/cassandra/SchemaLoader.java
```

FIG. 10    TABLE I: Basic facts of the subjects

| Subjects | Rel. | #Files | #Mons | #Com. | LOC |
|---|---|---|---|---|---|
| Activemq | 5.13.3 | 1235-4120 | 124 | 9241 | 138-404k |
| Avro | 1.7.7 | 156-444 | 52 | 1383 | 41-178k |
| Camel | 2.12.4 | 1838-9866 | 84 | 16715 | 111-764k |
| Cassandra | 2.1.2 | 311-1337 | 66 | 15330 | 45-249k |
| CXF | 3.0.9 | 2861-6011 | 93 | 8937 | 315-709K |
| Flink | 1.0.2 | 1728-3210 | 22 | 8799 | 190-444k |
| GeoTools | 13.6 | 6328-7748 | 59 | 4906 | 768-1013k |
| Hibernate | 4.3.11 | 4780-7335 | 73 | 5675 | 394-568k |
| Hive | 1.2.1 | 511-3897 | 79 | 6889 | 142-753k |
| Mahout | 0.11.1 | 455-1213 | 80 | 3424 | 33-125k |
| Nutch | 2.3.1 | 376-438 | 101 | 2034 | 58-147k |
| OpenJPA | 2.4.0 | 1266-4457 | 100 | 4729 | 195-494k |
| PDFBox | 1.8.9 | 447-799 | 73 | 3664 | 49-121k |
| Pig | 0.15.0 | 594-1638 | 74 | 2754 | 95-369K |
| Spring | 3.2.16 | 3253-4920 | 73 | 11522 | 278-493k |
| Tika | 1.8 | 131-653 | 94 | 2497 | 10-79k |
| Wicket | 6.19.0 | 1879-3081 | 98 | 18373 | 127-279k |

Rel.: latest release number; #Files: range of file count; #Mons: evolution time in months; #Com.: total number of commits; LOC: range of LOC between the first and last releases.

FIG. 11

TABLE II: Feature Space Summary for each project

| Subjects | #FS | #Files.Dist | FS.Size | #InCom. |
|---|---|---|---|---|
| ActiveMQ | 195 | 1450 | 11.5 | 2.1 |
| Avro | 83 | 301 | 7.2 | 1.3 |
| Camel | 557 | 4396 | 11.4 | 2.8 |
| Cassandra | 232 | 578 | 7.3 | 1.6 |
| CXF | 134 | 1150 | 10.8 | 3.5 |
| Flink | 74 | 880 | 14.9 | 3.2 |
| GeoTools | 66 | 744 | 14.7 | 1.8 |
| Hibernate | 106 | 3230 | 38.1 | 2.6 |
| Hive | 318 | 1548 | 10.7 | 1.1 |
| Mahout | 82 | 579 | 8.9 | 2.1 |
| Nutch | 40 | 201 | 9.3 | 1.7 |
| OpenJPA | 78 | 804 | 16.2 | 3.4 |
| PDFBox | 40 | 201 | 5.9 | 2.5 |
| Pig | 112 | 784 | 10.5 | 1.3 |
| Spring | 214 | 1120 | 8.8 | 2.4 |
| Tika | 101 | 294 | 6.2 | 3.5 |
| Wicket | 100 | 1458 | 17.6 | 2.1 |
| Average | 149 | 1160 | 12.3 | 2.3 |

FS: the number of feature spaces;
Files.Dist: the number of distinct files of all feature spaces;
FS.Size: average number of files in a feature space;
InCom.: average number of commits made for each feature

FIG. 12

TABLE III: $aaCC$ vs $aaCCn$ for each project

| Project | $aaCC$ | $aaCCn$ | Project | $aaCC$ | $aaCCn$ |
|---|---|---|---|---|---|
| ActiveMQ | 3.221 | 0.039 | Hive | 5.928 | 0.132 |
| Avro | 2.707 | 0.165 | Mahout | 2.515 | 0.069 |
| Camel | 1.969 | 0.013 | Nutch | 1.654 | 0.079 |
| Cassandra | 11.104 | 0.467 | OpenJPA | 2.038 | 0.024 |
| CXF | 2.347 | 0.016 | PDFBox | 2.340 | 0.145 |
| Flink | 1.503 | 0.023 | Pig | 1.725 | 0.059 |
| GeoTools | 1.229 | 0.004 | Tika | 1.815 | 0.081 |
| Hibernate | 1.223 | 0.011 | Spring | 2.102 | 0.013 |
| Wicket | 1.726 | 0.036 | - | - | - |

FIG. 13 TABLE IV: $daaCC$ vs $daaCCn$ for each project

| Project | $daaCC$ | $daaCCn$ | Project | $daaCC$ | $daaCCn$ |
|---|---|---|---|---|---|
| ActiveMQ | 2.36 | 0.47 | Hive | 5.32 | 2.78 |
| Avro | 2.40 | 0.55 | Mahout | 2.28 | 0.19 |
| Camel | 1.31 | 0.11 | Nutch | 0.83 | 0.23 |
| Cassandra | 10.91 | 5.43 | OpenJPA | 0.95 | 0.23 |
| CXF | 1.34 | 0.09 | PDFBox | 1.03 | 0.57 |
| Flink | 1.21 | 0.13 | Pig | 1.32 | 0.32 |
| GeoTools | 0.68 | 0.04 | Tika | 1.80 | 0.35 |
| Hibernate | 0.71 | 0.18 | Spring | 1.33 | 0.11 |
| Wicket | 1.34 | 0.43 | | – | – |

FIG. 14

TABLE V: Metric values for each project

| Project | DL | FDL | Project | DL | FDL |
|---|---|---|---|---|---|
| ActiveMQ | 78% | 52% | Hive | 55% | 21% |
| Avro | 82% | 63% | Mahout | 92% | 87% |
| Camel | 84% | 68% | Nutch | 77% | 60% |
| Cassandra | 39% | 16% | OpenJPA | 70% | 53% |
| CXF | 88% | 91% | PDFBox | 47% | 86% |
| Flink | 79% | 65% | Pig | 55% | 49% |
| GeoTools | 88% | 87% | Tika | 84% | 59% |
| Hibernate | 65% | 42% | Spring | 86% | 72% |
| Wicket | 72% | 65% | | - | - |

FEATURE DECOUPLING LEVEL

STATEMENT REGARDING GOVERNMENT SUPPORT

This invention was made with government support under Contract No. 1514315 awarded by the National Science Foundation. The government has certain rights in the invention.

BACKGROUND

Being able to add features quickly to a software project is essential for companies and is an objective of software architectural design. There is a design principle, "Software entities (classes, modules, functions, etc.) should be open for extension, but closed for modification." A highly extensible and maintainable software architecture may allow features to be added without extensive ripple effects. The problem is, how may we tell if and to what extent features are actually independent? Without a quantitative measure, it may hard to tell if an architecture is "good enough" to support feature delivery, if a refactoring effort is needed, or whether a refactoring was successful (so that adding features became easier).

There has not been much research into dependencies among features as evidenced by a project's revision history, which reflects the actual difficulty of maintaining features. Feature delivery velocity has been used as a productivity measure, but without quantitative measurement and deeper understanding of the interaction between architecture and features, it is difficult to manage and compare feature delivery velocity over time and across projects.

Design Rule theory, Design Structure Matrix (DSM), and Design Rule Hierarchy clustering are known to those of ordinary skill in the art. Design Rule theory proposes that independent modules, that is, modules that may be changed or even replaced without influencing other parts of the system, may create significant value in the form of options. In software, we expect features are independent from each other, so that they may be added and improved easily, increasing the overall value of the system. Design Structure Matrix (DSM) may be used to visualize independent modules and design rules that decouple these modules. A DSM is a square matrix. Its rows and columns are labeled with the same set of design elements in the same order. Annotations in a cell reflect dependencies between the elements on the row and the element on the column. For example, in the DSM in FIG. 1a, the elements are files, and the "x" in cell (circled) indicates that file SelectStatement_java depends on file Selection_java.

This DSM has been clustered into a Design Rule Hierarchy (DRH) that manifests the independent modules and design rules in the software. A DRH may include two features: 1) elements in a layer depend on files in the upper layers; 2) elements in each layer are grouped into modules (the boxes along the diagonals), and these modules are mutually independent from the other modules in the same layer. Therefore, modules in the lowest layer are truly independent modules. According to the design rule theory, these modules may produce the highest value because they may be changed or replaced without affecting the rest of the system.

The DSM in FIG. 2A shows a DRH with 4 layers: L1: (rc1-rc5), L2: (rc6-rc7), L3: (rc8-16), L4: (rc17-26). We may see that files in L2 only depend on files in L1, and files in L3 depend on files in L2 and L1. Each layer is grouped into mutually independent modules. Taking L4 as an example, it is decoupled into 9 independent modules: (rc17), (rc18-19), (rc20), (rc21), etc.

The columns and rows of a DSM, whether in FIG. 2A or FIG. 2B, have traditionally represented files, functions, or other code-level elements but here, they may be used to represent relations among functions.

SUMMARY OF THE EMBODIMENTS

We have extended the DSM modeling to represent multiple types of dependencies, including evolutionary coupling. For example, in FIG. 3, the textual annotations in a cell indicate different structural dependencies between files, such as call, implement, etc., and the number in a cell represents how many times the files have changed together in the project's revision history. For example, cell is annotated as "T,C,12" (circled) which means file SelectStatement_java has variables typed as Selection_java, and calls methods from Selection_java. The number "12" means that these files changed together 12 times in the project's revision history.

Given the lack of a widely accepted definition of "feature", we propose a concept called a "Feature Space", and define Feature Dependency based on evolution history. We visualize the dependency relations among a system's features using a Feature Dependency Structure Matrix (FDSM), in which features are the first-class elements. We also propose a Feature Decoupling Level (FDL) metric to measure the level of independence among features, as evidenced in revision history. FDL is a counterpart to the Decoupling Level (DL) metric that measures modules formed by explicit, syntactic dependencies among files. Even though the algorithms of FDL and DL are similar, FDL measures feature dependencies derived from revision history over a period of time, whereas DL measures the syntactic relations among source files at given point in time.

DL may faithfully reflect the level of modularity of a system. It is also widely accepted that a well-modularized system should better support the addition and modification of features. If FDL is a valid metric, it should quantitatively reflect this relation. And this quantification may provide an important tool for architects and project managers who seek predictability regarding the level of difficulty in maintaining features.

The FDL values of most projects may be strongly correlated with DL: The higher the DL, the more features were actually independent from each other. But exceptions do exist Even for a well-modularized system, certain kinds of features may be difficult to add. In these cases, it may be seen how one may use these models and metrics to monitor and explore the interaction between architecture and features, understanding under what circumstances an architecture may better support which types of features.

BRIEF DESCRIPTION OF THE DRAWINGS

Figure 2A:
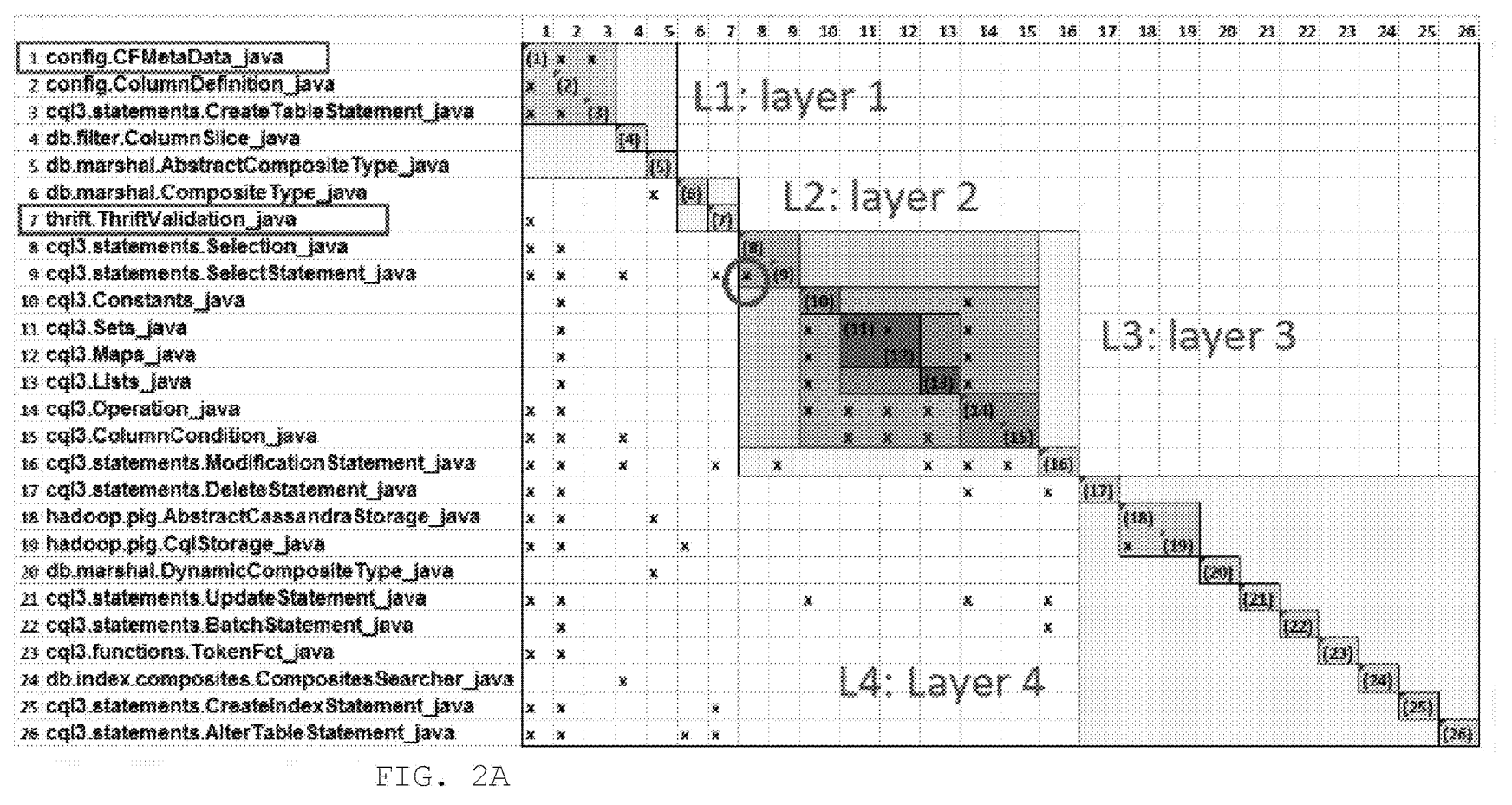

FIG. 2A shows DSMs of two Feature Spaces.

FIG. 2B shows DSK of Cassandra-2617 FeatureSpace.

FIG. 3 shows DSM of Cassandra-6561 with different types of dependencies.

FIG. 4 shows an Example Commit for Cassandra.

FIG. 5 shows an Example of Feature Design Structure Matrix.

FIG. 6A shows an FDSM where All features are isolated with FDL=100%.

FIG. 6B shows an FDSM where all features are highly coupled with FDL=10%.

FIG. 6C shows an FDSM where some features are coupled and form an FDRH of 5 layers with FDL=50%.

FIGS. 9A-9F show Feature Space DSMs of AVRO.

FIG. 10, Table I, shows basic facts of the subjects.

FIG. 11, Table II shows a feature space summary for each project.

FIG. 12, Table III shows aaCC vs aaCC for each project.

FIG. 13, Table IV shows daaCC vs daaCCn for each project.

FIG. 14, Table V shows metric values for each project.

DETAILED DESCRIPTION OF THE EMBODIMENTS

1. Hardware Introduction

Figure 1A:
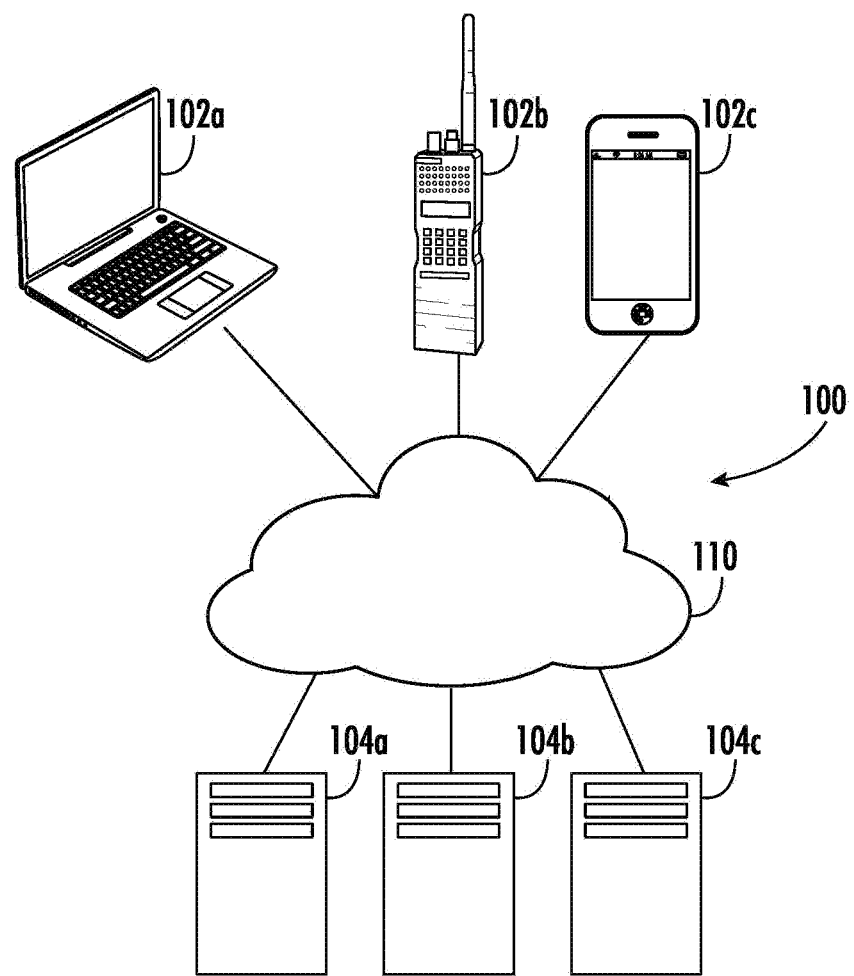
FIG. 1A shows a network diagram of different components of the system.

The system and method for the feature decoupling level method and system described may be implemented using system and hardware elements shown and described herein. For example, FIG. 1A shows an embodiment of a network 100 with one or more clients 102a, 102b, 102c that may be local machines, personal computers, mobile devices, servers, or tablets that communicate through one or more networks 110 with servers 104a, 104b, 104c. It should be appreciated that a client 102a-102c may serve as a client seeking access to resources provided by a server and/or as a server providing access to other clients.

The network 110 may be wired or wireless. If it is wired, the network may include coaxial cable, twisted pair lines, USB cabling, or optical lines. The wireless network may operate using BLUETOOTH, Wi-Fi, Worldwide Interoperability for Microwave Access (WiMAX), infrared, or satellite networks. The wireless links may also include any cellular network standards used to communicate among mobile devices including the many standards prepared by the International Telecommunication Union such as 3G, 4G, and LTE. Cellular network standards may include GSM, GPRS, LTE, WiMAX, and WiMAX-Advanced. Cellular network standards may use various channel communications such as FDMA, TDMA, CDMA, or SDMA. The various networks may be used individually or in an interconnected way and are thus depicted as shown in FIG. 1A as a cloud.

The network 110 may be located across many geographies and may have a topology organized as point-to-point, bus, star, ring, mesh, or tree. The network 110 may be an overlay network which is virtual and sits on top of one or more layers of other networks.

In most cases, every device on a network has a unique identifier. In the TCP/IP protocol, the unique identifier for a computer is an IP address. An IPv4 address uses 32 binary bits to create a single unique address on the network. An IPv4 address is expressed by four numbers separated by dots. Each number is the decimal (base-10) representation for an eight-digit binary (base-2) number, also called an octet. An IPv6 address uses 128 binary bits to create a single unique address on the network. An IPv6 address is expressed by eight groups of hexadecimal (base-16) numbers separated by colons.

An IP address can be either dynamic or static. A static address remains constant for a system unless modified by a user. Dynamic addresses are assigned by the Dynamic Host Configuration Protocol (DHCP), a service running on the network. DHCP typically runs on network hardware such as routers or dedicated DHCP servers.

Dynamic IP addresses are issued using a leasing system, meaning that the IP address is only active for a limited time. If the lease expires, the computer will automatically request a new lease. Sometimes, this means the computer will get a new IP address, too, especially if the computer was unplugged from the network between leases. This process is usually transparent to the user unless the computer warns about an IP address conflict on the network (two computers with the same IP address).

Another identifier for a device is the hostname. A hostname is a human-readable label assigned to a device and can be modified by a user. Hostname can be resolved to the IP address of the device. This makes hostname a more reliable device identifier in a network with dynamic IP addresses.

Information in the IP Address may be used to identify devices, geographies, and networks. The hostname may be used to identify devices.

A system may include multiple servers 104a-c stored in high-density rack systems. If the servers are part of a common network, they do not need to be physically near one another but instead may be connected by a wide-area network (WAN) connection or similar connection.

Management of group of networked servers may be de-centralized. For example, one or more servers 104a-c may include modules to support one or more management services for networked servers including management of dynamic data, such as techniques for handling failover, data replication, and increasing the networked server's performance.

The servers 104a-c may be file servers, application servers, web servers, proxy servers, network appliances, gateways, gateway servers, virtualization servers, deployment servers, SSL VPN servers, or firewalls.

When the network 110 is in a cloud environment, the cloud network 110 may be public, private, or hybrid. Public clouds may include public servers maintained by third parties. Public clouds may be connected to servers over a public network. Private clouds may include private servers that are physically maintained by clients. Private clouds may be connected to servers over a private network. Hybrid clouds may, as the name indicates, include both public and private networks.

The cloud network may include delivery using IaaS (Infrastructure-as-a-Service), PaaS (Platform-as-a-Service), SaaS (Software-as-a-Service) or Storage, Database, Information, Process, Application, Integration, Security, Management, Testing-as-a-service. IaaS may provide access to features, computers (virtual or on dedicated hardware), and data storage space. PaaS may include storage, networking, servers or virtualization, as well as additional resources such as, e.g., the operating system, middleware, or runtime resources. SaaS may be run and managed by the service provider and SaaS usually refers to end-user applications. A common example of a SaaS application is SALESFORCE or web-based email.

A client 102a-c may access IaaS, PaaS, or SaaS resources using preset standards and the clients 102a-c may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1B:
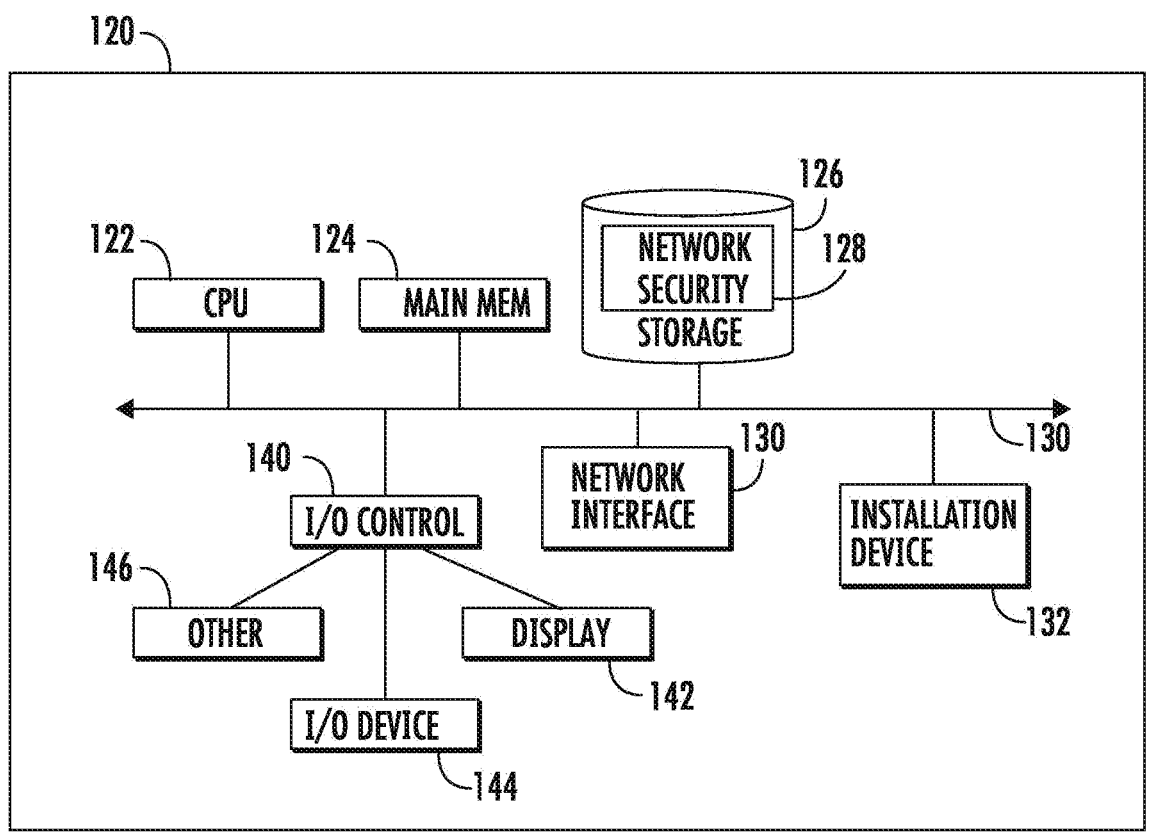
FIG. 1B certain hardware components for use with the system.

The clients 102a-c and servers 104a-c may be embodied in a computer, network device or appliance capable of communicating with a network and performing the actions herein. FIGS. 1A and 1B show block diagrams of a computing device 120 that may embody the client or server discussed herein. The device 120 may include a system bus 150 that connects the major components of a computer system, combining the functions of a data bus to carry information, an address bus to determine where it should be sent, and a control bus to determine its operation. The device includes a central processing unit 122, a main memory 124, and storage device 126. The device 120 may further include a network interface 130, an installation device 132 and an I/O control 140 connected to one or more display devices 142, I/O devices 144, or other devices 146 like mice and keyboards.

The storage device 126 may include an operating system, software, and a network user behavior module 128, in which may reside the network user behavior system and method described in more detail below.

The computing device 120 may include a memory port, a bridge, one or more input/output devices, and a cache memory in communication with the central processing unit.

The central processing unit 122 may be a logic circuitry such as a microprocessor that responds to and processes instructions fetched from the main memory 124. The CPU 122 may use instruction level parallelism, thread level parallelism, different levels of cache, and multi-core processors. A multi-core processor may include two or more processing units on a single computing component.

The main memory 124 may include one or more memory chips capable of storing data and allowing any storage location to be directly accessed by the CPU 122. The main memory unit 124 may be volatile and faster than storage memory 126. Main memory units 124 may be dynamic random-access memory (DRAM) or any variants, including static random-access memory (SRAM). The main memory 124 or the storage 126 may be non-volatile.

The CPU 122 may communicate directly with a cache memory via a secondary bus, sometimes referred to as a backside bus. In other embodiments, the CPU 122 may communicate with cache memory using the system bus 150. Cache memory typically has a faster response time than main memory 124 and is typically provided by SRAM or similar RAM memory.

Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, 3D printers, and VR headsets.

Additional I/O devices may have both input and output capabilities, including haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures.

In some embodiments, display devices 142 may be connected to the I/O controller 140. Display devices may include liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, VR or 3D displays.

The computing device 120 may include a network interface 130 to interface to the network 110 through a variety of connections including standard telephone lines LAN or WAN links (802.11, T1, T3, Gigabit Ethernet), broadband connections (ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols. The computing device 120 may communicate with other computing devices via any type and/or form of gateway or tunneling protocol such as Secure Socket Layer (SSL) or Transport Layer Security (TLS). The network interface 130 may include a built-in network adapter, network interface card, PCMCIA network card, EXPRESSCARD network card, card bus network adapter, wireless network adapter, USB network adapter, modem or any other device suitable for interfacing the computing device 120 to any type of network capable of communication and performing the operations described herein.

The computing device 120 may operate under the control of an operating system that controls scheduling of tasks and access to system resources. The computing device 120 may be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein.

The computer system 120 can be any workstation, telephone, desktop computer, laptop or notebook computer, netbook, tablet, server, handheld computer, mobile telephone, smartphone or other portable telecommunications device, media playing device, a gaming system, mobile computing device, or any other type and/or form of computing, telecommunications or media device that is capable of communication.

The status of one or more machines 102a-c, 104a-c may be monitored, generally, as part of network management In one of these embodiments, the status of a machine may include an identification of load information (the number of processes on the machine, CPU and memory utilization), of port information (the number of available communication ports and the port addresses), session status (the duration and type of processes, and whether a process is active or idle), or as mentioned below. In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

II. Feature Related Discussion

The following features may be used in and with the invention described herein: Feature Space, Feature Dependency, Feature Dependency Structure Matrix (FDSM), and Feature Decoupling Level (FDL). The invention may also be used with software, system, and methods as described in US published applications 2016/0203071 and US 2018/0374024, which are both incorporated by reference as if fully set forth herein.

A. Feature Space

We represent each feature using a feature space ("feature" for short), which may be considered as a 3-element tuple:

FeatureSpace=<TimeSpan; FileSet;DSMp>

TimeSpan is a pair of timestamps recording the date when the first and last commit of the feature were made: TimeSpan=(startDate; endDate).

FileSet is the set of files added or modified for the feature: FileSet={f1, f2 . . . fm}, where m is the total number of distinct files.

DSMr is the snapshot of the feature in release r, represented by a DSM, i.e. <Vr,Er>. Vr is a subset of FileSet, modeling the files related to the feature in release r, Er is the structural or evolutionary relation among Vr.

FileSet may contain all the files ever changed or added for the feature in a given time period, but some files maybe changed or deleted during software evolution. As a result, at a given release, the snapshot of the feature may only contain a subset of FileSet. Accordingly, the DSM of the same feature at different releases may be different.

We may derive a FeatureSpace for each feature using the project's revision history and issue tracking systems. As an example, FIG. 4 depicts a Git commit for the Apache Cassandra project (a free open source database management system), showing that this commit: 1) was made on 2011-06-15, and 2) was to implement issue CASSANDRA-2617, which is labeled as a new feature in the project's Jira issue tracking record. Six java files in the rectangle were added/changed for this commit, and the two numbers in front of each line indicate the number of LOC added and removed respectively. This was the only commit related to the feature recorded in the revision history.

Using the above information, we may model the FeatureSpace of CASSANDRA-2617 as follows:

TimeSpan: (2011-06-15; 2011-06-15).
FileSet: {CFMetaData, QueryProcessor, StatementType, CassandraServer, ThriftValidation, SchemaLoader.}
DSMr: the DSM of this feature space in the latest release of Cassandra may be found in FIG. 2B.

If multiple commits were made for the same feature, then the FileSet will contain the union of all involved files, and its endDate will be the date of the last commit.

B. Feature Dependency

We may define the dependency relation, FSDep, among features as a binary relation on a set of FeatureSpaces, FS. If a feature, fsy depends on fsx, i.e. (fsy; fsx) e FSDep, it means that some files involved in fsy already exist in fsx. In other words, when fsy is added or modified, there may be a change to existing files in fsx, which was created before fsy.

For two features fsa and fsb, there are four possibilities.
If fsa.FileSet∩fsb.FileSet=Ø, it means these two features are mutually independent;

If fsa.FileSet∩fsb:FileSet≠Ø, then:
1) if fsa was committed before fsb, then fsb depends on fsa, otherwise, fsa depends on fsb;
2) If fsb and fsa were committed together, then both (fsa; fsb) and (fsb; fsa) belong to FSDep;

FIG. 2A depicts the feature space DSM of CASSANDRA-6561, a feature that was committed in 2014. Its feature space has two files (in boxes at rows 1 and 7) that were created or changed for CASSANDRA-2617 in 2011. According to the definition, feature CASSANDRA-6561 depends on feature CASSANDRA-2617.

C. Feature Dependency Structure Matrix (FDSM)

Figure 5:
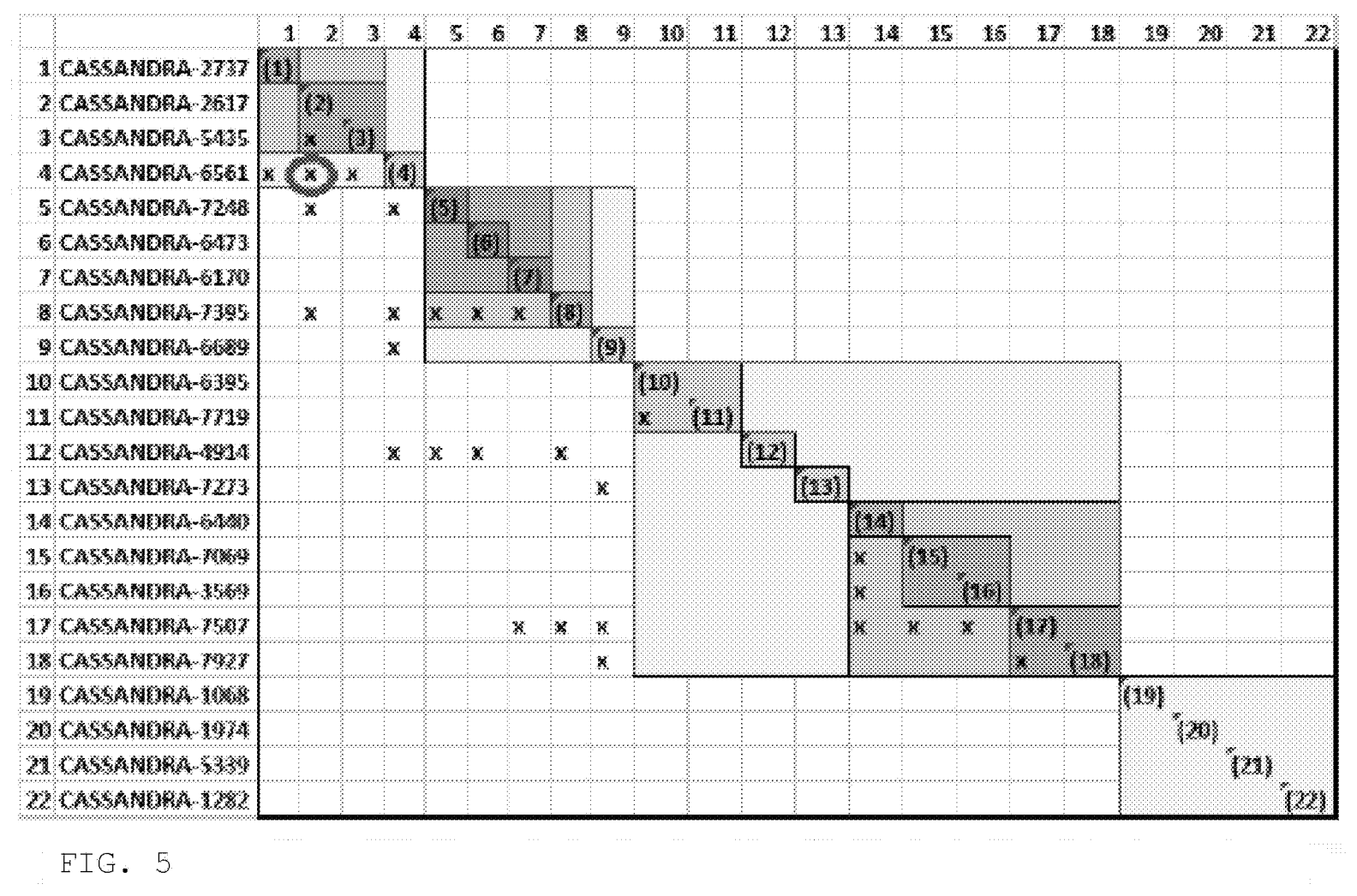

Similar to the Design Structure Matrix (DSM) introduced above, we may define a Feature Dependency Structure Matrix (FDSM) as a tuple: <FS, FSDep>, where FS is a set of feature spaces and FSDep is their dependency relation defined above. A FDSM may also be visualized in a square matrix, whose columns and rows are labeled with the same set of features in the same order. If a cell in row x, column y—i.e. cell(x; y)—is not empty, it means that feature x depends on feature y. For example, FIG. 5 shows a FDSM formed by a subset of features in the Cassandra project. The cell (4; 2) (circled) indicates that feature CASSANDRA-6561 depends on 2617, as we have seen above.

This FDSM is clustered using the DRH algorithm as taught by Y. Cai, H. Wang, S. Wong, and L. Wang in "Leveraging design rules to improve software architecture recovery," which is incorporated by reference as if fully set forth herein. This publication is currently available at https://www.cs.drexel.edu/~yfcai/papers/2013/QoSA2013.pdf.

This hierarchy has four layers: L1: (rc1-rc4), L2: (rc5-rc9), L3: (rc10-rc18) and L4: (rc19-rc22). Features in L2 only depend on the features in L1. Features in L3 depend on the features in its upper layers, that is, L2 and L1, but are not depended on by any other features. L4 contains isolated features that do not have any dependencies with any other features. According to this DSM, features in L4 may be changed or replaced without influencing other features. Feature groups in L3 may also change together freely.

D. Feature Decoupling level (FDL)

Decoupling Level (DL) may be a metric that may be used to measure the level of independence among modules formed by syntactical relation. Since DL has shown to be an effective measure of module independence, we borrowed and modified the algorithm so that it could be applied to FDSM.

Similar to the original DL algorithm, FDL calculates the decoupling level of each module in each layer and adds them together. For a feature module in upper layers, the number of other features it influences are taken into consideration; for a feature module in the last layer, the number of features within the module is considered. Different from the original DL algorithm that excludes isolated files, FDL includes isolated features, calculating their respective FDL values and adding them together.

Figures 6A, 6B:
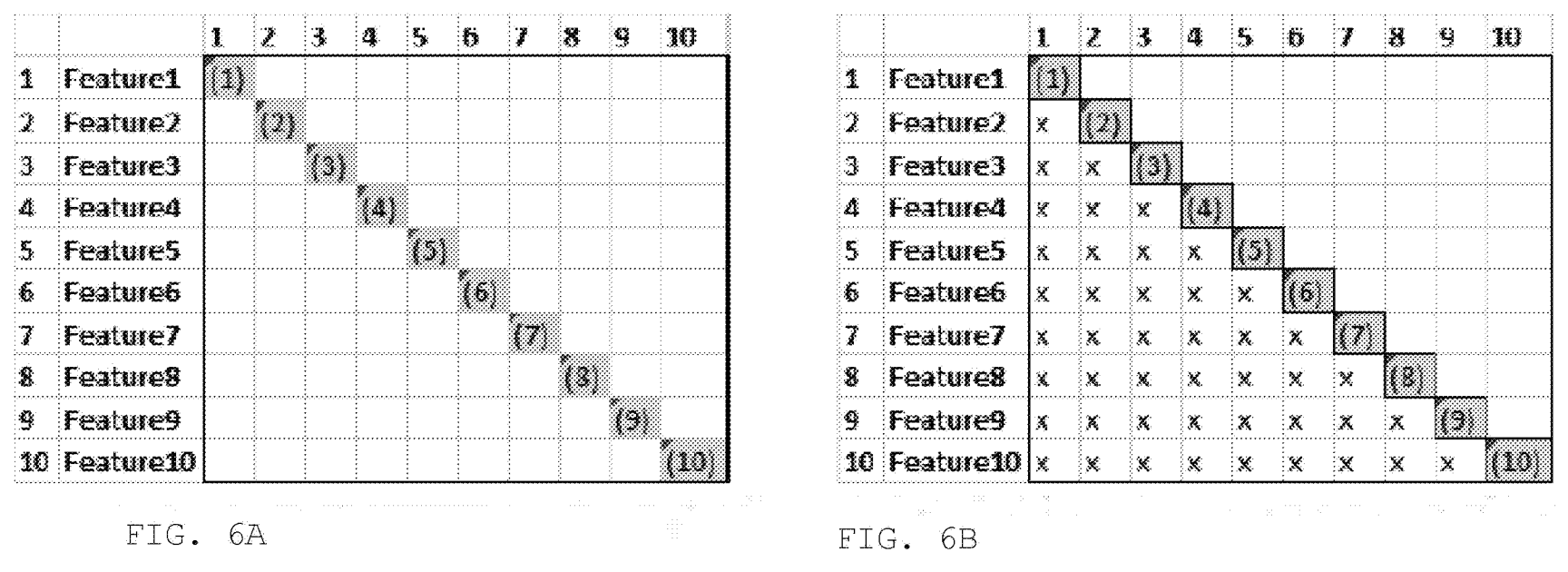
Figure 6C:
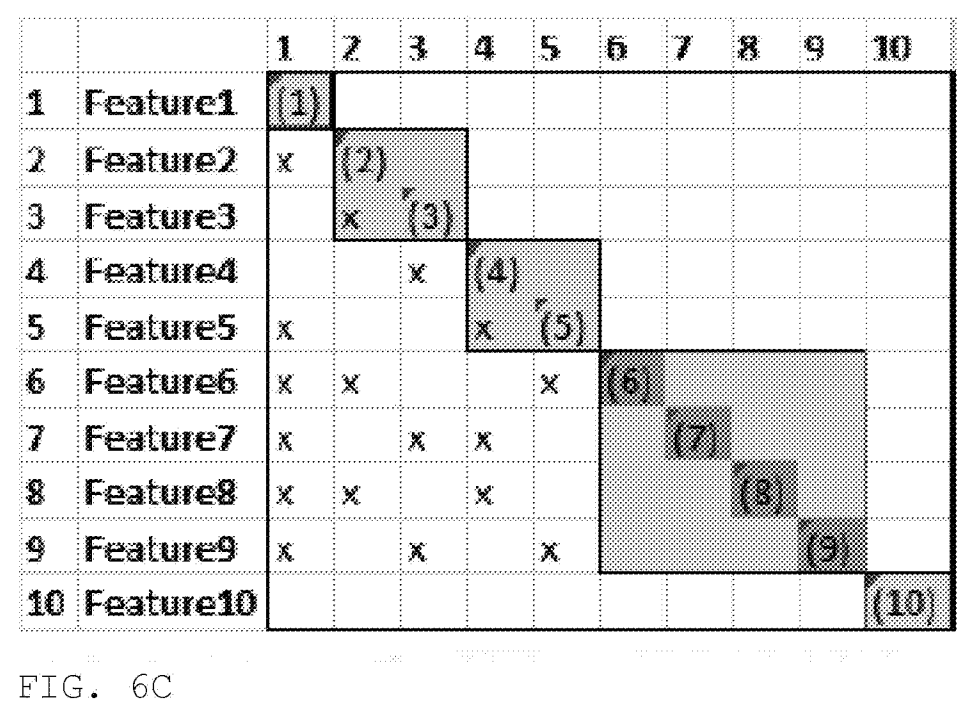

FIGS. 6A and 6B present 3 different FDSMs with different FDLs. The features in FIG. 6A are completely isolated from each other, hence its FDL is 100%. FIG. 6B shows a FDSM where the features are highly coupled except for Feature 10 that could be changed easily, and its FDL is just 10%. FIG. 6C shows a FDSM with 5 layers, and its FDL is 50%, meaning that 50% of all the features were relatively independent from each other.

Note that FDSM and structural DSM (SDSM) are different. An FDSM does not represent syntactical relations among files as a SDSM does. Instead, an FDSM captures evolutionary dependencies and time sequence. For example, consider feature fsa containing files {f1; f2; f3}, and feature fsb that was added after fsa, containing files {f4, f5}. Since these two features do not share files, they appear to be mutually independent in a FDSM. However, it is possible that f4 calls f1, a syntactic relation that links fsa with fsb, but is not reflected in the FDSM. It is possible that when f1 in feature fsa is changed, f4 in fsb also has to be changed.

However, even if a FDSM does not represent syntactical relationships among features, it represents their fundamental (semantic) relationship: The files within the same feature indeed change together far more often than files not within the same feature, showing that a FDSM reveals meaningful relationships.

III. Evaluation

To evaluate these concepts, we studied the following research questions, using a corpus of 17 open source projects as an empirical base. We created a set of tools to support this evaluation, including programs that take a system's revision history, issue tickets, and a snapshot of its source code as inputs, and generate FDSMs and DSMs for each feature space of each project using Titan to visualize and cluster FDSMs.

Research Question 1 (RQ1): Do files contained in a feature space form a semantically meaningful group in that they are changed together more often?

Our definition of feature space is simple and straightforward, only considering files that were committed together to resolve issues labeled as new features. But is this simple definition adequate? For example, it is possible that as software evolves, files are added to a feature, but such commits are not labeled as "new features". In this case, the newly added files will be missing from our feature space. We also note that files within a FDSM that appear to be independent may have syntactic dependencies. Moreover, in other related research, the definitions of feature vary and the set of files considered to be part of a feature may be drastically different from ours.

The question is, may our feature space model capture file groups that are meaningful and useful to developers? If the answer to this question is true, then each feature space may form a maintainable unit and should be treated separately. For example, maintenance tasks for each feature may be assigned to different teams, and if there is a bug in a feature, developers may examine the corresponding feature space—identifying potentially implicated files—to aid in debugging.

RQ2: Are feature spaces that depend on each other more likely to change together?

Similarly, if the answer to this question is positive, it means that FDSM has the potential to help developers better maintain and debug features: if two features depend on each other and are frequently changed together, when one feature changes, the developers may use FDSMs to figure out which other features (and hence files) are also likely to be changed.

RQ3: May FDL reflect architectural maintainability?

It is widely accepted that a better-modularized system should be easier to maintain. And, more importantly, a better modularized system should make it easier to add or modify features. If FDL faithfully reflects the ease of adding features, then it should align with architectural quality measures. We investigate this question by exploring the correlation of FDL—a history measure—and DL—a structural measure.

RQ4: Is it possible for a well-modularized system to have a low FDL, or for a seemingly poorly modularized system to have a high FDL?

Several interested parties have complained that sometimes a system appears to have "good quality" as measured by, for example, coupling and cohesion metrics, but may still be difficult to understand and maintain. It would be interesting to see if there are similar phenomena in open source projects.

Since the ultimate purpose of architectural design and refactoring is to ease feature delivery (rather than improving metrics) if this divergence does occur, it will be interesting to explore the reasons so that the architecture may be further improved. We demonstrate how to use FS, FDL and FDSM to explore feature/architecture evolution and interaction.

A. Subjects

To answer the above research questions, we selected 17 open source projects as the subjects. We chose these projects because they have different sizes, length of history and domains, and have evolved for significant period of time. Moreover, these projects are well managed; for example, features are labeled separately from other types of issues. FIG. 10, Table I presents the facts of the subject projects. FIG. 11, Table II reports the statistics of the feature spaces for each project, and its last row shows the average for each column.

B. Feature Space as Maintainable Unit

To answer the first research question, we quantify how frequently two files were changed together in the revision history using cochange: when two files A and B were changed together in one commit, we consider that their cochange(fa; fb) is 1.

The higher the value of cochange(fa; fb), the more frequently these two files were changed together. For files within a feature space, FSk, we calculated how frequently each pair changed together and the average:

Avg_CC_FSk=$1/n \times \Sigma_i^n \Sigma_j^n$ cochange(fi; fj)/n, where fi, fj are files involved in FSk, i≠j, n is the number of files involved in FSk and n>=2.

For each file in FSk, we also calculated how frequently it was changed with files NOT in the same feature space:

Avg_CC_nFSk=$1/n \times \Sigma_i^n \Sigma_j^m$ cochange(fi; fj)/m where fi is inside FSk, fj is outside FSk, n and m are the numbers of files inside and outside FSk respectively.

FIG. 12, Table III reports the average of all avg CC FSk values (aaCC) and the average of all avg_CC_nFSk (aaCCn) values for each project. The result shows that aaCC is much higher than aaCCn over all projects, indicating files within a feature space change together more frequently.

We also used the Paired T-test to compare whether the avg CC FSk is significantly larger than the avg CC nFSk over all features for each project. The T-tests on all of subject projects have P-values less than 0.01. We may conclude that each feature space captures a group of highly evolutionarily coupled files. The implication is that the files in a feature space have a high likelihood of being changed together in the future.

Figure 3:
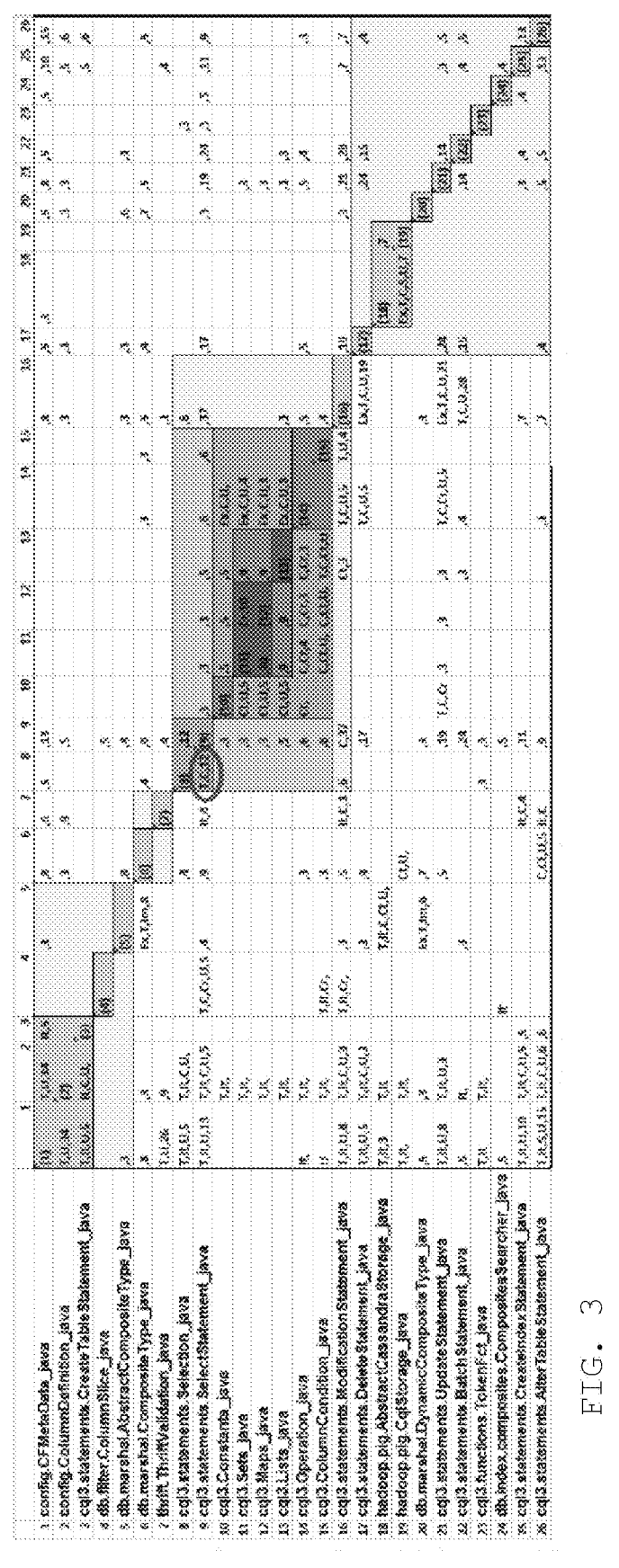

As an example, FIG. 3 depicts a DSM of the Cassandra-6561 feature space. From the large co-change numbers in the cells, we may tell that files within this feature space have changed together very often in the project's history.

C. Dependent Features

To answer the second research question, we first quantify how frequently two features, FSa and FSb, were changed together. We calculated the average cochange between their involved files as follows:

aCC(FSa; FSb)=$1/n \times \Sigma_i^n \Sigma_j^m$ cochange(fi; fj)/m where fi and fj are the file involved in FSa and FSb, n and m are the number of files in FSa and FSb respectively.

For each of the dependent features, FSk, we calculated the average cochange among their files as follows: FSk_Dep_aCC=1/m×Σ$_i^m$aCC (FSk, FSi), where m is the number of features depended by FSk, FSi is a feature depended by FSk.

For independent features:

FSk_NDep_aCC=1/n×Σ$_i^n$aCC (FSk, FSi), where n is the number of features independent to FSk.

FIG. 13, Table IV reports the average of all FSk_Dep_aCC values (daaCC) and the average of all FSk_NDep_aCC (daaCCn) values for each project. These results demonstrate that daaCC is much higher than daaCCn over all projects, which indicates that a feature's files were changed together with its dependent feature's files more often.

Again, for each project, we conducted a Paired T-test to explore whether FSk Dep aCC is significantly larger than FSk_NDep_aCC. We observed that all these T-tests show P-values less than 0.01, indicating that files in dependent features are more likely to change together, comparing to files in mutually independent features. The implication is that if one feature changes, the developer may use FDSM to check what other features might also need to be changed.

D. Feature Independence and Structural Independence

The results from the above two research questions show that files in a feature space or in dependent features are more likely to change together. A maintainable architecture should allow features to be added and changed relatively independently.

And it is widely accepted that a well-modularized system should be easy to maintain. Thus, if FDL is a valid metric it should align with architectural modularity measures.

Decoupling level (DL), which has been discussed by M. Ran, C. Yuanfang, K. Rick, X. Lu, and F. Qiong in Decoupling level: A new metric for architectural maintenance complexity, which is incorporated by reference as if fully set forth herein may be used to compare different projects, and may indicate significant architectural changes, such as refactoring or severe degradation. Our experiences with over 150 industrial and open source projects shows that DL reliably reflects the level of modularity of a software system. To evaluate if FDL is a reliable indicator of the ease of adding/modifying features, we explored the correlation between FDL—a pure history measure—and DL—a pure structural measure.

For this purpose, we calculated the DL and FDL values for each of our subject projects, as reported in FIG. 14, Table V. Both DL and FDL change during the evolution of a project, so we chose to calculate these metrics from the latest version of each project. We made this choice because, as we have previously shown, DL values remain stable in consecutive releases of a project, unless there was substantial refactoring or degradation.

Based on our detailed analysis of these projects, we did not observe any significant changes in their architecture during the latest few releases, so the DL from the last release was determined to be sufficiently representative in each case.

For FDL values, since features may be drastically different from each other, it is intuitive that FDL fluctuates more than DL, as we will show in the next subsection. In particular, it is natural that at the beginning of a project when the architecture is not fully stabilized, the value of FDL may change more drastically. We deliberately chose projects that have evolved for a sufficiently long time (more than 6.5 years on average) under the assumption that the architecture should be stabilized and so should be the project's ability to support feature addition. As a result, the FDL of the latest version should also be representative.

We conducted a Pearson Correlation Analysis between DL and FDL. The results show the Pearson values is 0.65 and p-value is 0.004, meaning the correlated relationship is statistically significant. The correlation of 0.65 is considered strong. However, from FIG. 6, we observed a prominent outlier: PDFBox, whose DL is only 47%, but its FDL is as high as 86%. If we remove this outlier, the correlation among the remaining 16 projects increases to 91%, indicating that, within these projects, those with higher DL (i.e., those that are well-modularized) also have very high FDL (features may be added/modified more independently). In particular, all 3 projects with highest DL values (larger than 87%) also have FDL of at least 87%, meaning that more than 87% of their features may be maintained independently.

This study shows that in general, FDL and DL are strongly correlated but we did find one exception. We examine PDFBox in detail in the next subsection to understand why this project is special, and to understand the meaning of a divergence between FDL and DL.

E. The Interaction between Architecture and Feature Addition

The fact the PDFBox has a relatively low DL but very high FDL triggered our curiosity to dig more into its architecture and evolution history. Next we explore why PDFBox was an outlier, and the variation of FDL of each project to see how the ability of adding new features changes over time. Finally, we qualitatively explain how DL, FDL, DSM and FDSM may be used to explore the interaction between architecture and features.

1) PDFBox: We first note that even though PDFBox has been evolving for about 6 years, it has only 40 features recorded in its history, whereas the average number of features for all 17 of our subject projects is 149. In addition, the average number of files within each feature is the smallest among the 17 projects: 5.9 vs. the average of 12.3. We then calculated the number of files within all PDFBox feature spaces and found that 26 out of 40 features (65%) have just 1 or 2 files.

To further understand the architecture and features of PDFBox, we ordered all features according to their commit time date and generated the DSM for the latest version. The 4 largest features—with more than 10 files each—are among the earliest features added to the system, as part of the infrastructure. For example, the largest feature, PDFBox-572 (73 files), was added as the 5th feature.

According to its revision history: the purpose of this feature was "Upgrading PDFBox (incl. JempBox and FontBox) to use Java 5 specifications".

Next we studied the structural DSM of PDFBox and observed several big "blobs" that explain its relatively low DL: for example, there is a parser in the system (which is naturally complex), and it employed a visitor pattern to handle exceptions (which contains a dependency cycle). Fortunately, most features added later to this system do not involve this infrastructural code. Also, in PDFBox's own documentation, it states the following: "Optional dependencies: Some features in PDFBox depend on optional external libraries. You may enable these features simply by including the required libraries in the classpath of your application." This optionality may explain why the number of files of most features, extracted from cocommits, is small.

In summary, PDFBox exemplifies the case where some parts of the architecture are not well-modularized, but they are stable and not involved in new features. In such a case, it is still possible to achieve a high FDL. This is consistent with our notion of architectural debt: Even if a part of the system is not well modularized or has a lot of code smells, as long as this part is not generating interest, it is not a debt.

Figure 7:
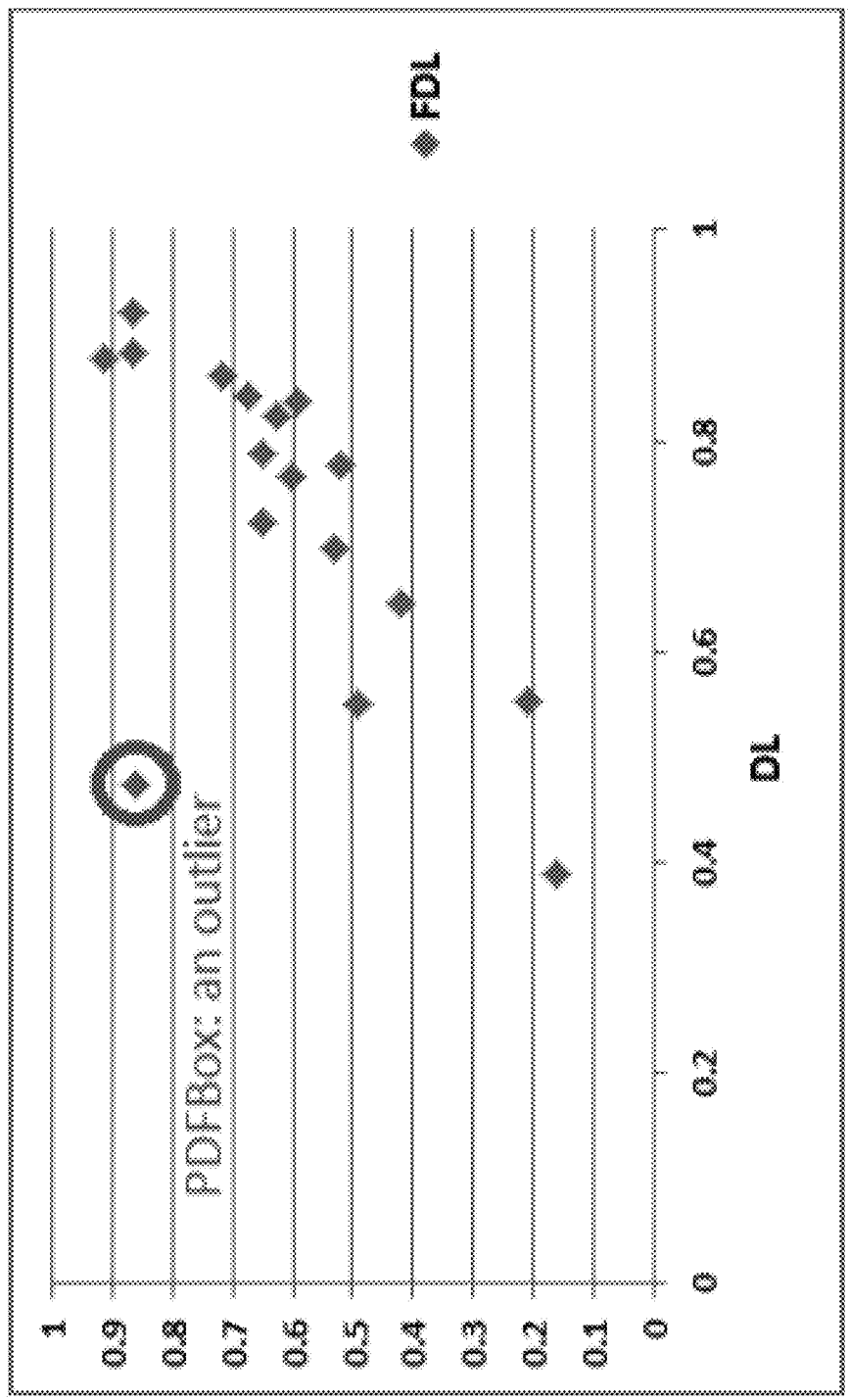
FIG. 7 shows the correlation between DL and FDL.
Figure 8B:
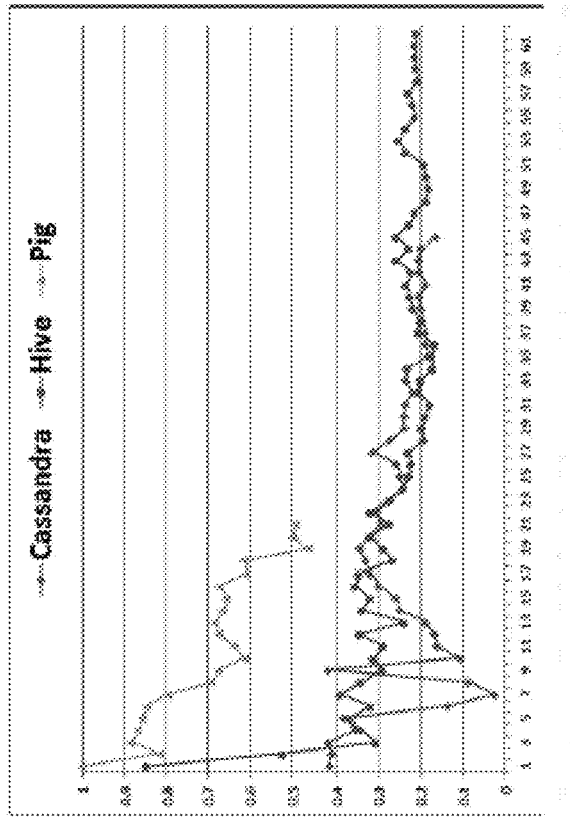
FIG. 8B shows projects with medium DL values.
Figure 8A:
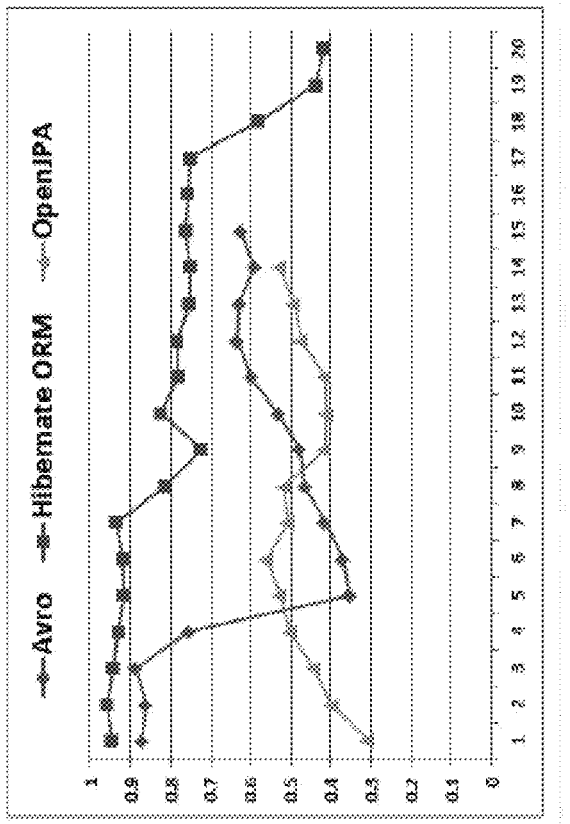
FIG. 8A shows projects with lowest DL values.
Figure 8C:
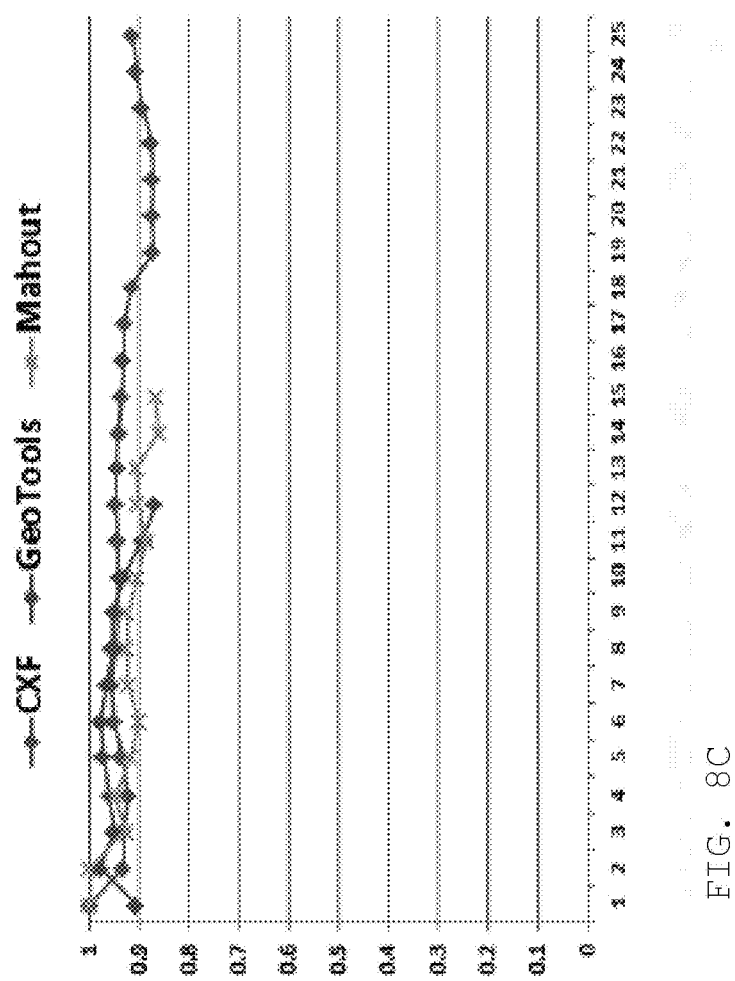
FIG. 8C shows projects with the highest DL values.

2) The Variation of FDL: The exploration of PDFBox triggered another question: are there cases where the DL is very high, but the FDL is low? Also, does FDL remain stable if the architecture remain stable? To answer these questions, we first ordered the features added to each project according to their commit time, and then calculated the FDL values for every 5 features added. That is, we calculated the FDL after the first 5 features were added, the first 10 features, 15 features, etc. The charts of all projects may be found in our data website. 2 FIG. 7 depicts several representative cases: the FDL variation for projects with lowest DL values (FIG. 8a), highest DL values (FIG. 8C), and the projects in the middle (FIG. 8B).

These charts reveal the following interesting phenomena: for projects that are extremely well modularized (high DL values), their features are also highly independent from each other (high FDL values), over all or most of their feature addition history. In the projects with low DL values, by contrast, their FDL values fluctuated when the first set of features were added, and then stabilized at a low level (less than 40%), or showed a steady downward trend.

The projects whose DLs are in the middle, however, experienced ups and downs during their feature addition history. Take Hibernate ORM as an example. This project has evolved for over 6 years, and its FDL chart showed that its features are less and less independent over time. We calculated the DL values of its previous snapshots, and found that its DL decreased from 69% to 65%. For Avro and OpenJPA, their DLs increased from 72% to 82% in 4 years, and 55% to 77% in 8 years respectively. We may see fluctuating but upward trends for both projects. The FDL of AVRO is higher than that of OpenJPA most of the time, which is consistent with the fact that AVRO has a higher DL in general. These charts, again, showed that FDL and DL are highly correlated: they tend to increase or decrease together.

However, even for a project with high DL, its FDL may be low from time to time. For example, the FDL measured after the 33th feature of AVRO is the lowest of all its history. If the measures were taken at that time, how does one tell if the low FDL is caused by a degrading architecture, or it is just because the system hasn't evolved long enough yet? Next we explore this question.

Figure 9A:
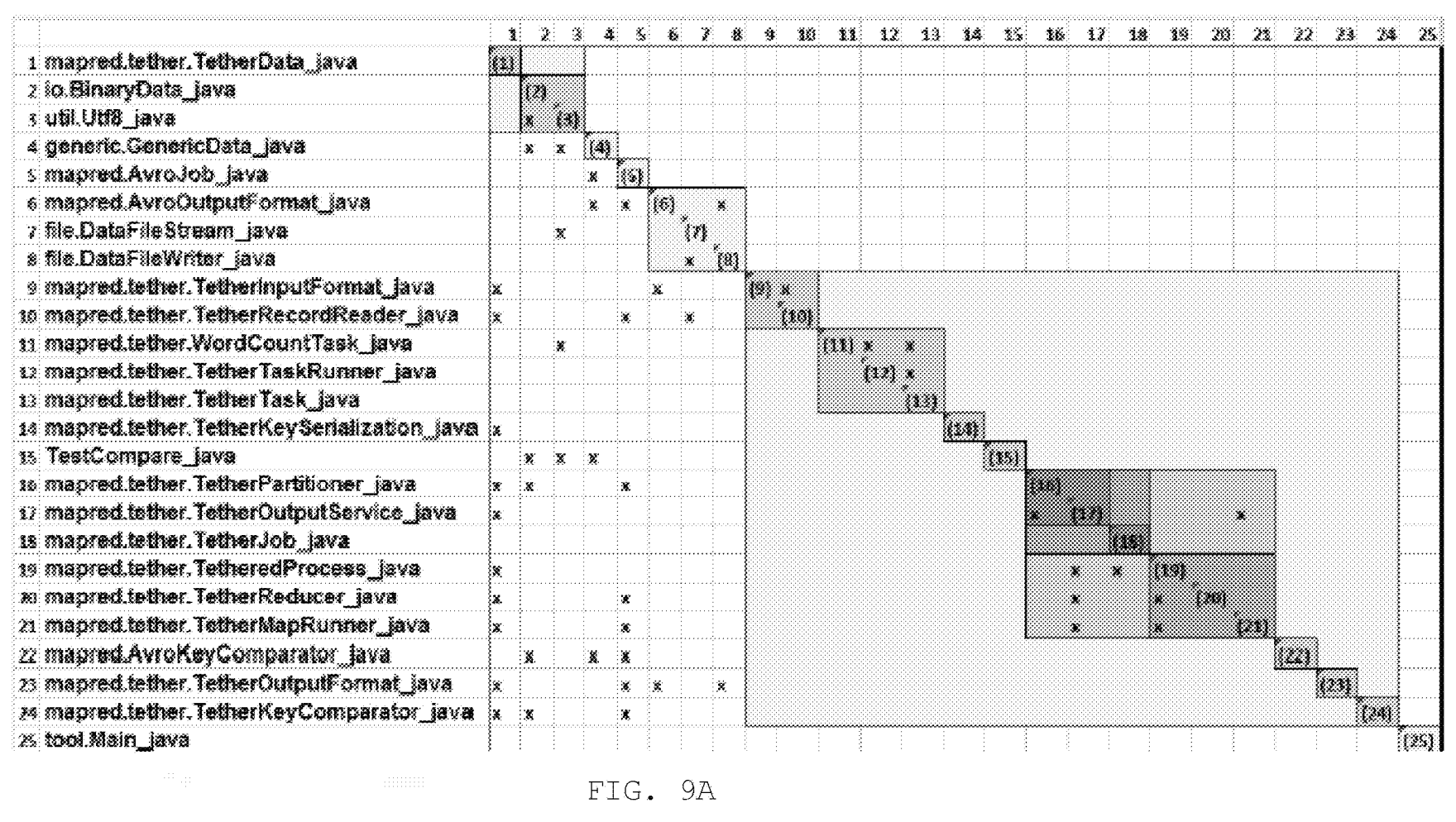
Figure 9B:
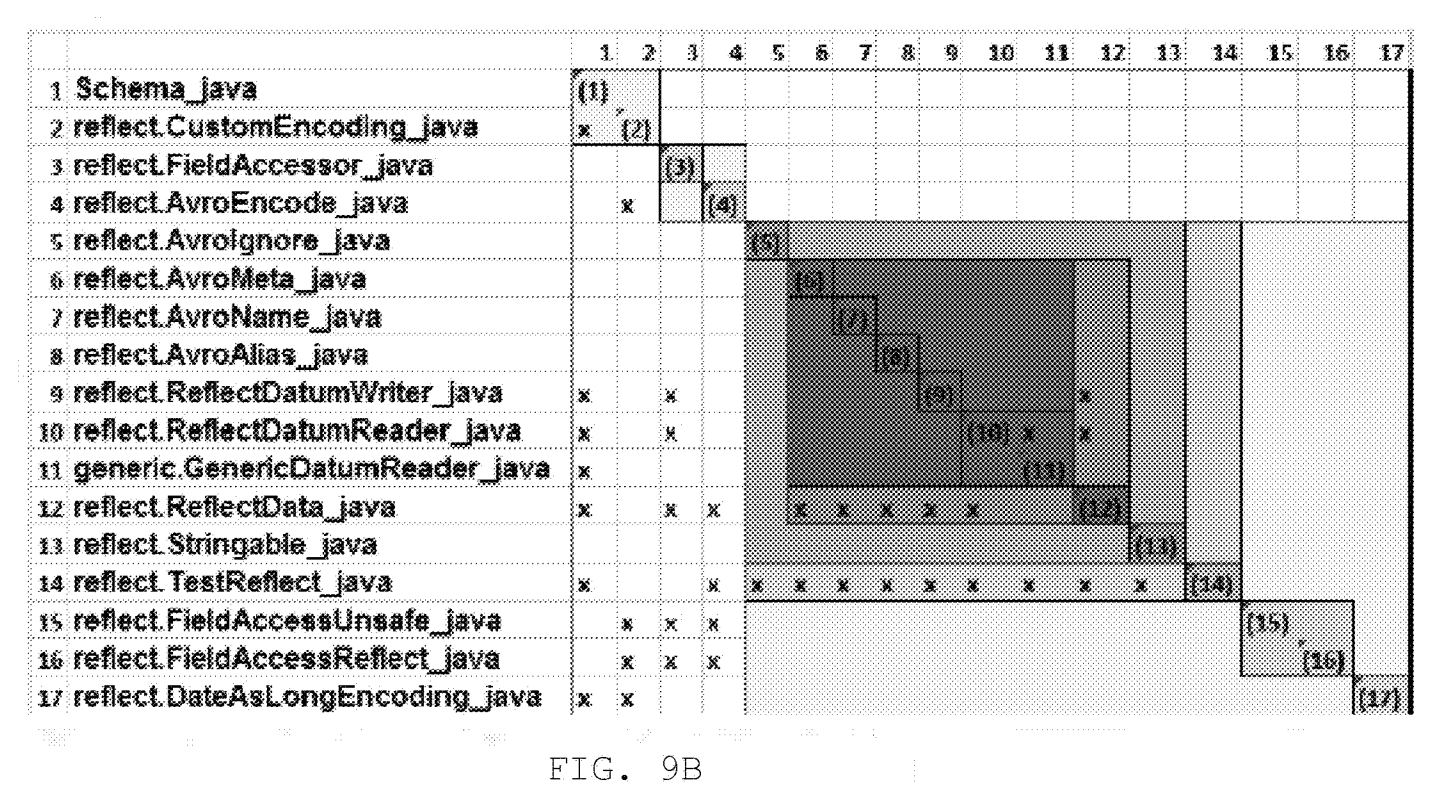
Figures 9C, 9D, 9E, 9F:
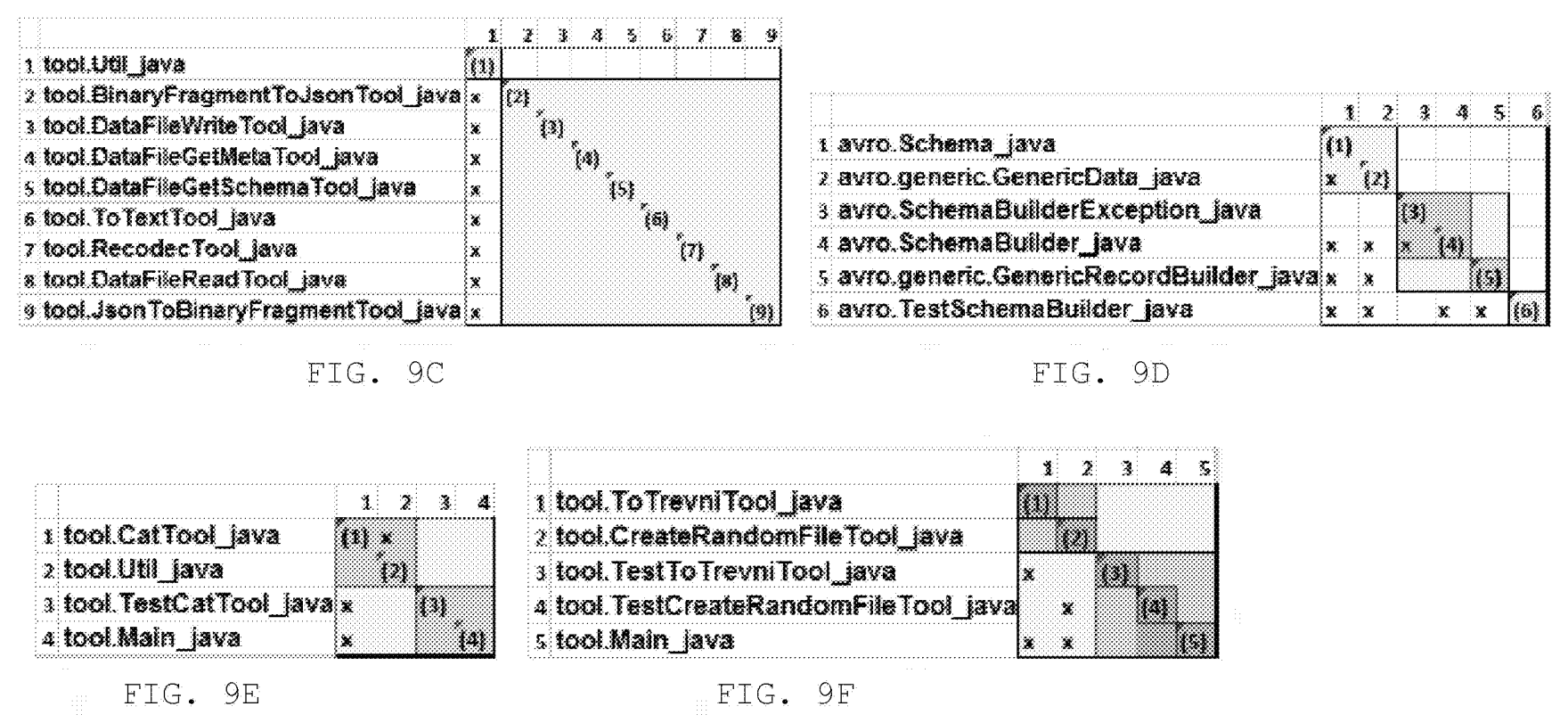

3) The Interaction of Architecture and Features: Now we demonstrate how to use DSM and FDSM to explore the interaction between architecture and features, using AVRO as an example. FIG. 9A is the feature space DSM of AVRO-512, the 29th feature added to the system; the FDL after this feature was added dropped to 36%. From the DSM, we may see that this feature has 25 files, involving multiple namespaces.

The revision log of AVRO made it clear that this feature is also a infrastructure level feature, described as "Define And Implement Mapreduce Connector Protocol". This feature was added in 2010, the second year after AVRO became an Apache project. By contrast, the features added more recently were much smaller and more independent. FIGS. 9B-9E depict the feature space DSMs of 5 features added in 2013-2014. We may see that these features are all small, and the files were all added or changed within the same namespace. According to their revision log, these are not infrastructure features, and the architecture supports their addition easily.

For an architect, feature space DSMs may be used to analyze why a FDL is decreasing, and to analyze each feature: if a feature is naturally complex and will be part of the system's infrastructure, it is normal that its addition may temporarily lower the DL and FDL. As long as the architect envisions that most new features may be easily added in the future, this is fine. If the value of FDL indeed increases over time, this means that the architect's vision is correct. By contrast, if an architect observed continuously decreasing FDL and DL values, and most features, infrastructural or not, could not be added independently, then it is an alarming sign that the features are not aligned with the architecture, and the architecture should be reevaluated.

IV. APPLICATIONS

To assess, compare, and monitor the ease of adding new features to a software system we have proposed and formally defined Feature Space, Feature Dependency, and Feature Decoupling Level. After investigating thousands of features within 17 open source projects, we reported that files within the same feature space, as well as files in dependent features are much more likely to be changed together, indicating that these feature spaces form meaningful "modules" that should be identified so that they may be analyzed and maintained.

We also showed that in, most cases, the FDL metric (a pure history measure) and DL (a pure structural measure) are highly correlated, indicating that FDL is reliable indicator of architecture maintainability.

Our study also showed that, in some rare cases a system with a low DL may also have a high FDL. Furthermore even for systems with high DLs, adding features may be difficult from time to time, depending on the nature of the features, the maturity of the architecture, and their interactions. Using real examples, we demonstrated how DSMs, FDSMs, DL and FDL may be combined to analyze the interaction between architectural structure and features, so that the architecture may be evolved in an informed way, to better support feature addition.

Thus in use, Feature Space, Feature Dependency, and Feature Decoupling Level may be incorporated into analytical software or even as part of hardware, to measure maintainability of architecture and identify poor performing architecture modules that may require revision and improvement. For example, if an FDL score is low, a system may identify architecture for redesign. Further, the measures may be taken over time to measure a change in score over time (like FDL change over time), which would allow a user to make small adjustments to insure features may be added and modified easily.

Thus different from existing metrics in particular, FDL demonstrated its potential to measure how well a system can support features addition during software evolution. High correlation between FDL and DL suggests that the ability to add features is rooted in architecture, not individual code pieces.

While the invention has been described with reference to the embodiments above, a person of ordinary skill in the art would understand that various changes or modifications may be made thereto without departing from the scope of the claims.

The invention claimed is:

1. A method that monitors and improves, via a processor, a computer program quality by measuring maintainability of architecture and identifying poor performing architecture modules using the following steps:
    identifying a computer program quality corresponding to a measure of a feature decoupling level of a computer program, wherein the feature decoupling level comprises a level of dependence among computer program features over time;
    identifying the computer program quality based on a Feature Dependency Structure Matrix (FDSM), which is a tuple <FS, FSDep>, where the FS is a set of feature spaces and the FSDep is a dependency relation of the set of feature spaces, wherein the FDSM captures evolutionary feature dependencies and time sequence and shows a relationship that files within a same feature change together more often than files not within the same feature change, wherein two features that do not share files are identified as mutually independent in the FDSM; and redesigning the computer program based on the measure.

2. The method of claim 1, wherein the feature decoupling level measures feature dependencies derived from revision history over a period of time.

3. The method of claim 1, wherein the level of dependence is shown in the FDSM.

4. The method of claim 1, wherein measuring the feature decoupling level further comprises using a revision history of the computer program.

5. The method of claim 1, wherein the measure uses a feature space defined as a 3-element tuple: FeatureSpace= (TimeSpan, FileSet, DSMr); wherein the TimeSpan is a pair of timestamps recording a date when a first and last commit of a feature were made:

TimeSpan=(startDate; endDate); the FileSet is a set of files added or modified for the feature:

FileSet={f1, f2, . . . fm} where the m is a total number of distinct files; the DSMr is a snapshot of the feature in release r, represented by a DSM as (Vr, Er), where Vr is a subset of the FileSet, modeling files related to the feature in the release r, the Er is a structural or evolutionary relation among the Vr.

6. The method of claim 1, wherein the feature decoupling level calculates a decoupling level of each module in each layer and adds the decoupling levels together.

7. A method for improving, via a processor, a computer program quality by measuring maintainability of architecture and identifying poor performing architecture modules based on the following steps:

identifying a computer program quality based on a Feature Dependency Structure Matrix (FDSM), the computer program quality corresponding to a measure of a feature addition ease of a computer program, wherein maintainability is measured using a metric corresponding to how the computer program can be decoupled into independently replaceable modules, wherein the FDSM captures evolutionary feature dependencies and time sequence and shows a relationship that files within a same feature change together more often than files not within the same feature; and redesigning the computer program based on the measure.

8. The method of claim 7, wherein a feature decoupling level of the computer program measures feature dependencies derived from revision history over a period of time.

9. The method of claim 8, wherein the measure uses a feature space defined as a 3-element tuple: FeatureSpace= (TimeSpan, FileSet, DSMr); wherein the TimeSpan is a pair of timestamps recording a date when a first and last commit of a feature were made: TimeSpan=(startDate; endDate); the FileSet is a set of files added or modified for a feature: FileSet={f1, f2, . . . fm} where the m is a total number of distinct files; the DSMr is a snapshot of the feature in release r, represented by a DSM as (Vr, Er), where the Vr is a subset of the FileSet, modeling files related to the feature in the release r, the Er is a structural or evolutionary relation among the Vr.

10. The method of claim 8, wherein the feature decoupling level calculates a decoupling level of each module in each layer and adds the decoupling levels together.

11. The method of claim 7, wherein a level of dependence is shown in the FDSM.

12. The method of claim 7, further comprising creating a Feature Dependency Structure Matrix (FDSM), which is a tuple <FS, FSDep>, where the FS is a set of feature spaces and the FSDep is a dependency relation of the set of feature spaces, wherein the FDSM captures evolutionary feature dependencies and time sequence and shows the relationship.

13. The method of claim 12, wherein two features that do not share files are identified as mutually independent in the FDSM.

14. A method comprising: analyzing and improving, via a processor, a software architecture by measuring maintainability of the architecture and identifying poor performing architecture modules using the following steps:

measuring a feature decoupling level of a computer program by creating a Feature Dependency Structure Matrix (FDSM) comprising a tuple <FS, FSDep>, where the FS is a set of feature spaces and the FSDep is a dependency relation therebetween, where feature spaces define the rows and columns within the matrix, and an indicator in an overlapping row and column indicates an evolutionary feature dependency over time, wherein the FDSM shows a relationship that files within a same feature change together more often than files not within the same feature; and redesigning the architecture based on the measure.

* * * * *